US008055556B2

(12) United States Patent
Taylor et al.

(10) Patent No.: US 8,055,556 B2
(45) Date of Patent: Nov. 8, 2011

(54) USER INTERFACE FOR RAPID ENTRY OF TIMESHEET DATA

(75) Inventors: Stanley E. Taylor, San Jose, CA (US); J. Michael Leftwich, Plano, TX (US); Ione C. Pang, Woodside, CA (US); Patteaswaran Karivaradasamy, Plano, TX (US); Judd C. Jacobs, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 433 days.

(21) Appl. No.: 12/046,584

(22) Filed: Mar. 12, 2008

(65) Prior Publication Data

US 2009/0234761 A1 Sep. 17, 2009

(51) Int. Cl.
*G07B 17/00* (2006.01)
*G07F 19/00* (2006.01)

(52) U.S. Cl. .................. 705/30; 705/32; 705/38; 705/39

(58) Field of Classification Search ..................... 705/32, 705/7, 8, 10, 14, 1, 38, 39; 707/10, 102, 707/5; 715/33, 234, 232, 227, 769, 753
See application file for complete search history.

(56) References Cited

U.S. PATENT DOCUMENTS

| 6,415,305 | B1 * | 7/2002 | Agrawal et al. | 715/232 |
|---|---|---|---|---|
| 6,626,955 | B1 * | 9/2003 | Agrawal et al. | 715/232 |
| 7,081,823 | B2 * | 7/2006 | Gluhovsky et al. | 340/636.1 |
| 7,263,506 | B2 * | 8/2007 | Lee et al. | 705/38 |
| 7,747,966 | B2 * | 6/2010 | Leukart et al. | 715/792 |
| 2002/0099649 | A1 * | 7/2002 | Lee et al. | 705/38 |
| 2002/0123865 | A1 * | 9/2002 | Whitney et al. | 702/189 |
| 2002/0129055 | A1 * | 9/2002 | Agrawal et al. | 707/504 |
| 2002/0188632 | A1 * | 12/2002 | Su | 707/513 |
| 2003/0033226 | A1 * | 2/2003 | Anderson | 705/32 |
| 2003/0195793 | A1 * | 10/2003 | Jain et al. | 705/10 |
| 2005/0049903 | A1 * | 3/2005 | Raja | 705/7 |
| 2005/0097207 | A1 * | 5/2005 | Gluhovsky et al. | 709/224 |
| 2006/0206800 | A1 * | 9/2006 | Agrawal et al. | 715/503 |
| 2007/0050710 | A1 * | 3/2007 | Redekop | 715/523 |
| 2007/0055592 | A1 * | 3/2007 | Vu | 705/32 |
| 2007/0094110 | A1 * | 4/2007 | McCrea | 705/32 |
| 2007/0282721 | A1 * | 12/2007 | Ducolon et al. | 705/32 |
| 2008/0120158 | A1 * | 5/2008 | Xiao et al. | 705/8 |
| 2009/0152349 | A1 * | 6/2009 | Bonev et al. | 235/383 |

(Continued)

OTHER PUBLICATIONS

Eva Rosenberg, "Quickbooks 2008—Update—additional Resources", Feb. 29, 2008, TaxMama.com, pp. 1-3.*

(Continued)

*Primary Examiner* — Matthew Gart
*Assistant Examiner* — Olusegun Goyea
(74) *Attorney, Agent, or Firm* — Park, Vaughan, Fleming & Dowler LLP; Steven E Stupp

(57) ABSTRACT

A user interface for receiving time entries in a timesheet is described. This user interface includes a user-interface element in the form of a calendar, where the calendar contains one or more time entries associated with at least a financial activity. Moreover, a given time entry, which is associated with a corresponding block of time, is graphically represented as an adjustable region in the calendar. Additionally, a user can change one or more temporal parameters associated with the time entry by using a pointing device to select and modify one or more geometric properties of the adjustable region.

31 Claims, 15 Drawing Sheets

U.S. PATENT DOCUMENTS

2009/0158173 A1* 6/2009 Palahnuk et al. ............. 715/753

OTHER PUBLICATIONS

Brett Burney, "Exchanging your Old Outlook for the New", Sep. 25, 2007, Law.com, pp. 1-5.*

S. E. Black, "Friendly, useful features make this operating system a must-have for home users", Aug. 30, 2007, p. 5.*

Brett Burney, Exchanging Your Old Outlook for the New, Sep. 9 2007, Legal Technology, Law.com.*

Eva Rosenberg, QuickBooks 2008, Feb. 29 2008, Tax Podcasts from TaxMama.com.*

Microsoft Office Outlook 2003 Product Guide.*

Business Editors. (Aug. 17). Bill Power 6.2—Time & Billing Software for Microsoft Office, Lotus SmartSuite, & Symantec Act! Business Wire,1. Retrieved Aug. 13, 2011, from Business Dateline. (Document ID: 43986614).*

Time-billing professionals get organized. (Oct. 1999). Computer Dealer News, 15(37), 42. Retrieved Aug. 13, 2011, from ProQuest Computing. (Document ID: 45463188).*

* cited by examiner

```
                                                              ┌─ 300
┌─────────────────────────────────────────────────────────────┐
│   DISPLAY A CALENDAR THAT CONTAINS ONE OR MORE TIME ENTRIES │
│  ASSOCIATED WITH AT LEAST A FINANCIAL ACTIVITY, WHERE A GIVEN TIME │
│    ENTRY IS GRAPHICALLY REPRESENTED AS AN ADJUSTABLE REGION IN THE │
│       CALENDAR ASSOCIATED WITH A CORRESPONDING BLOCK OF TIME │
│                              310                            │
└─────────────────────────────────────────────────────────────┘
                              │
                              ▼
┌─────────────────────────────────────────────────────────────┐
│  RECEIVE USER INSTRUCTIONS TO CHANGE A GIVEN TIME ENTRY, WHERE THE │
│  USER INSTRUCTIONS INVOLVE THE USER SELECTING AND MODIFYING ONE OR │
│    MORE GEOMETRIC PROPERTIES OF THE CORRESPONDING ADJUSTABLE │
│                    REGION FOR THE TIME ENTRY                │
│                              312                            │
└─────────────────────────────────────────────────────────────┘
                              │
                              ▼
┌─────────────────────────────────────────────────────────────┐
│   MODIFY THE DISPLAYED ADJUSTABLE REGION BASED ON THE RECEIVED │
│                      USER INSTRUCTIONS                      │
│                              314                            │
└─────────────────────────────────────────────────────────────┘
```

FIG. 3

△ USER     HOME LOGOUT HELP FEEDBACK

SWITCH TO ROW VIEW | COPY TIME SHEETS ▽ | VIEW MY TIMESHEETS | PRINTABLE VIEW

| | WEEK<br>MON, 10/1 | DAY<br>TUE, 10/2 | ▽ WEEK OF OCT 1, 2007 △<br>WED, 10/3 | THU, 10/4 | FRI, 10/5 | SAT, 10/6 | SUN, 10/7 |
|---|---|---|---|---|---|---|---|
| 2007 | | | | | | | △ |
| 8 AM | | | | | | | |
| 9 AM | FROM ROW VIEW | | | | | | |
| 10 AM | OIL CHANGE<br>REGION<br>508-1 | CAR REPAIR<br>REGION<br>508-2 | CAR REPAIR<br>REGION<br>508-4 | CAR REPAIR<br>REGION<br>508-5 | | | |
| 11 AM | | | | | | | |
| 12 PM | | TRUCK REPAIR | | | | | |
| 1 PM | | | | | LUNCH | | |
| 2 PM | | | | | | | ▽ |
| TOTALS | 3 | 4 | 3 | 3 | 1 | 0 | 0 |

□ +  ADD 502
□ ×  DELETE 504
☰  SUMMARY 506

SUMMARY
SUBMITTED HOURS: 14
DOWNLOADED HOURS: 0
WORK HOURS: 14
VACATION HOURS: 0
SICK TIME HOURS: 0
OVERTIME HOURS: 0
TOTAL HOURS: 14

( EDIT SUBMITTED TIMESHEET ) ( SUBMIT TIMESHEET ) ( PARTIALLY SUBMITTED – SUBMIT AGAIN TO COMPLETE )

REGION 508-3

REGION 508-6

△ USER     HOME LOGOUT HELP FEEDBACK

SWITCH TO ROW VIEW | COPY TIME SHEETS ▽ | VIEW MY TIMESHEETS | PRINTABLE VIEW

| 2007 | WEEK<br>MON, 10/1 | DAY ▽<br>TUE, 10/2 | WED, 10/3 | ▽ WEEK OF OCT 1, 2007 △<br>THU, 10/4 | FRI, 10/5 | SAT, 10/6 | SUN, 10/7 |
|---|---|---|---|---|---|---|---|
| 8 AM | | | | | | | |
| 9 AM | FROM ROW VIEW | CAR REPAIR | CAR REPAIR | CAR REPAIR | VACATION<br>_522_ | | |
| 10 AM | OIL CHANGE<br>REGION<br>_508-1_ | REGION<br>_508-2_ | REGION<br>_508-4_ | REGION<br>_508-5_ | | | |
| 11 AM | | | | | | | |
| 12 PM | | | | | | | |
| 1 PM | | TRUCK REPAIR | | | LUNCH | | |
| 2 PM | | | | | | | |
| TOTALS | 3 | 4 | 3 | 3 | 1 | 0 | 0 |

REGION<br>508-3     REGION<br>508-6

( EDIT SUBMITTED TIMESHEET ) ( SUBMIT TIMESHEET ) ( PARTIALLY SUBMITTED - SUBMIT AGAIN TO COMPLETE )

[+] [X]

○ WORK    ⦿ TIME OFF

VACATION ▽

START
FRI, 10/5 ▽    9.00 AM ▽

STOP
FRI, 10/5 ▽    12.00 PM ▽

PULL-DOWN MENUS
512-2

△ USER   HOME  LOGOUT  HELP  FEEDBACK

SWITCH TO CALENDAR VIEW | COPY TIME SHEETS ▽ | VIEW MY TIMESHEETS | PRINTABLE VIEW

▽ WEEK OF OCT 1, 2007 △

| CUSTOMER | WHAT I DID | MON, 10/1 | TUE, 10/2 | WED, 10/3 | THU, 10/4 | FRI, 10/5 | SAT, 10/6 | SUN, 10/7 | TOTALS | BILLABLE |
|---|---|---|---|---|---|---|---|---|---|---|
| PAUL SMITH | MAINTENANCE | 8 | 0 | 0 | 0 | 0 | 0 | 0 | 8 | x |
|  | VACATION ▷ | 0 | 8 | 0 | 0 | 0 | 0 | 0 | 8 |  |
|  | TOTALS | 8 | 8 | 0 | 0 | 0 | 0 | 0 | 16 |  |

SUBMITTED HOURS: 0    DOWNLOADED HOURS: 0

(ADD ROW)  (DELETE ROW)  (USE TIMER)  (ADD TIME OFF)

(EDIT SUBMITTED TIMESHEET)  (SUBMIT TIMESHEET)  (PARTIALLY SUBMITTED – SUBMIT AGAIN TO COMPLETE)

FIG. 5I

FIG. 5J

USER INTERFACE FOR RAPID ENTRY OF TIMESHEET DATA

BACKGROUND

The present invention relates to a user interface for receiving time entries in a timesheet.

Financial software is often used to receive and aggregate timesheet entries associated with user activities. For example, employees may enter the hours they work into a timesheet, and this information may be used to generate paychecks for the employees. Similarly, users may enter the time that they work on different jobs or projects, and this information may be used to bill clients.

However, it is often cumbersome for users of existing financial software to enter this timesheet information. In particular, many existing user interfaces for receiving time entries are based on tables or tabular structures, which include editable boxes that can be modified to indicate timesheet information. However, these tables often do not provide context information in an intuitive manner. Consequently, it can be difficult for users to enter their timesheet information accurately and efficiently, which can degrade the user experience when using such financial software.

SUMMARY

One embodiment of the present invention provides a user interface for receiving time entries in a timesheet. This user interface includes a user-interface element in the form of a calendar, where the calendar contains one or more time entries associated with at least a financial activity. Moreover, a given time entry, which is associated with a corresponding block of time, is graphically represented as an adjustable region in the calendar. Additionally, a user can change one or more temporal parameters associated with the time entry by using a pointing device to select and modify one or more geometric properties of the adjustable region.

In some embodiments, the adjustable region for the given time entry displays information associated with an estimated financial activity based on one or more previous financial activities. For example, the one or more previous financial activities may include a most recent financial activity and/or a pattern of previous financial activities. Moreover, in some embodiments the estimated financial activity is determined using a supervised-learning technique.

In some embodiments, the financial activity is associated with: a customer, a project, a vendor, a service item, and/or an employee.

In some embodiments, the user interface includes a billing mechanism which uses the one or more time entries in the calendar to generate a bill for a customer based on the one or more time entries. Note that the one or more time entries may be used to specify time spent providing a service to the customer. Moreover, the one or more time entries may specify billable or non-billable time.

In some embodiments, the user interface includes a payroll-processing mechanism which uses the one or more time entries in the calendar to generate one or more paychecks for employees. Note that the one or more time entries may specify: time worked (including regular work and overtime), vacation time, sick time, and/or other time off (which may be paid or unpaid).

In some embodiments, the one or more temporal parameters of the given time entry include: a start time, a stop time and/or a duration of the given time entry.

Moreover, in some embodiments initial values of the one or more temporal parameters are determined by a timer application that was previously activated by the user. Alternatively (or additionally), the given time entry may be initialized using an estimated time entry with estimated temporal parameters.

In some embodiments, the user interface includes a table including one or more pull-down menus, where the user can modify parameters for the given time entry using the one or more pull-down menus. Moreover, contents of the one or more pull-down menus may be determined based on a user-selected context. Additionally, modifications to the given time entry may be reflected in the one or more pull-down menus.

Note that the user may select and modify the adjustable region by selecting a feature of the adjustable region and then dragging the feature from a first position in the calendar to a second position in the calendar. For example, the feature may include an edge of the adjustable region and/or a position of the adjustable region. Moreover, the one or more geometric properties may include a size of the adjustable region and/or a position of the adjustable region.

In some embodiments, the one or more time entries are in a form which is suitable for use by financial software, such as accounting software, payroll software and/or income-tax software.

In some embodiments, the user can replicate the time across multiple days in the calendar by selecting a feature of the adjustable region and dragging the feature from a first position in the calendar to a second position in the calendar. Note that the first position may be associated with one day and the second position may be associated with another day (such as an adjacent day).

Moreover, the user can divide the adjustable region into a first adjustable region and a second adjustable region by superimposing a third adjustable region over the adjustable region, where the third adjustable region is associated with a different financial activity than that of the first adjustable region or the second adjustable region. Alternatively (or additionally), the user can separate a time interval of the adjustable region into two time intervals by selecting or placing a splitter over the adjustable region. Furthermore, the user can change a position of the splitter by selecting and then dragging the splitter from a first position in the adjustable region to a second position in the adjustable region.

In some embodiments, the user interface includes a table, where the user defines parameters for multiple time entries in the table and then, for a given time entry, adjusts geometric properties of the corresponding adjustable region in the calendar. For example, the adjustable regions corresponding to the multiple entries may initially be stacked approximately on top each other in the calendar until the user adjusts the geometric properties of the multiple entries.

Another embodiment provides a method for receiving one or more time entries in a timesheet, which may be performed by a computer system. During operation, the computer system displays a calendar that contains one or more time entries associated with at least a financial activity, where a given time entry is graphically represented as an adjustable region in the calendar associated with a corresponding block of time. Then, the computer system receives user instructions to change a given time entry, where the user instructions involve the user selecting and modifying one or more geometric properties of the corresponding adjustable region for the time entry. Next, the computer system modifies the displayed adjustable region based on the received user instructions.

Another embodiment provides the computer system.

Another embodiment provides a computer program product for use in conjunction with the computer system. This computer program product may include instructions corresponding to at least some of the aforementioned operations in the method and/or that may be performed using the user interface.

BRIEF DESCRIPTION OF THE FIGURES

FIG. 3 is a flow chart illustrating a process for receiving one or more time entries in a timesheet in accordance with an embodiment of the present invention.

FIG. 5A is a screenshot illustrating a user interface for receiving time entries in a timesheet in accordance with an embodiment of the present invention.

FIG. 5B is a screenshot illustrating a user interface for receiving time entries in a timesheet in accordance with an embodiment of the present invention.

FIG. 5C is a screenshot illustrating a user interface for receiving time entries in a timesheet in accordance with an embodiment of the present invention.

FIG. 5D is a screenshot illustrating a user interface for receiving time entries in a timesheet in accordance with an embodiment of the present invention.

FIG. 5E is a screenshot illustrating a user interface for receiving time entries in a timesheet in accordance with an embodiment of the present invention.

FIG. 5F is a screenshot illustrating a user interface for receiving time entries in a timesheet in accordance with an embodiment of the present invention.

FIG. 5G is a screenshot illustrating a user interface for receiving time entries in a timesheet in accordance with an embodiment of the present invention.

FIG. 5H is a screenshot illustrating a user interface for receiving time entries in a timesheet in accordance with an embodiment of the present invention.

FIG. 5I is a screenshot illustrating a user interface for receiving time entries in a timesheet in accordance with an embodiment of the present invention.

FIG. 5J is a screenshot illustrating a user interface for receiving time entries in a timesheet in accordance with an embodiment of the present invention.

Note that like reference numerals refer to corresponding parts throughout the drawings.

DETAILED DESCRIPTION

Figure 1:
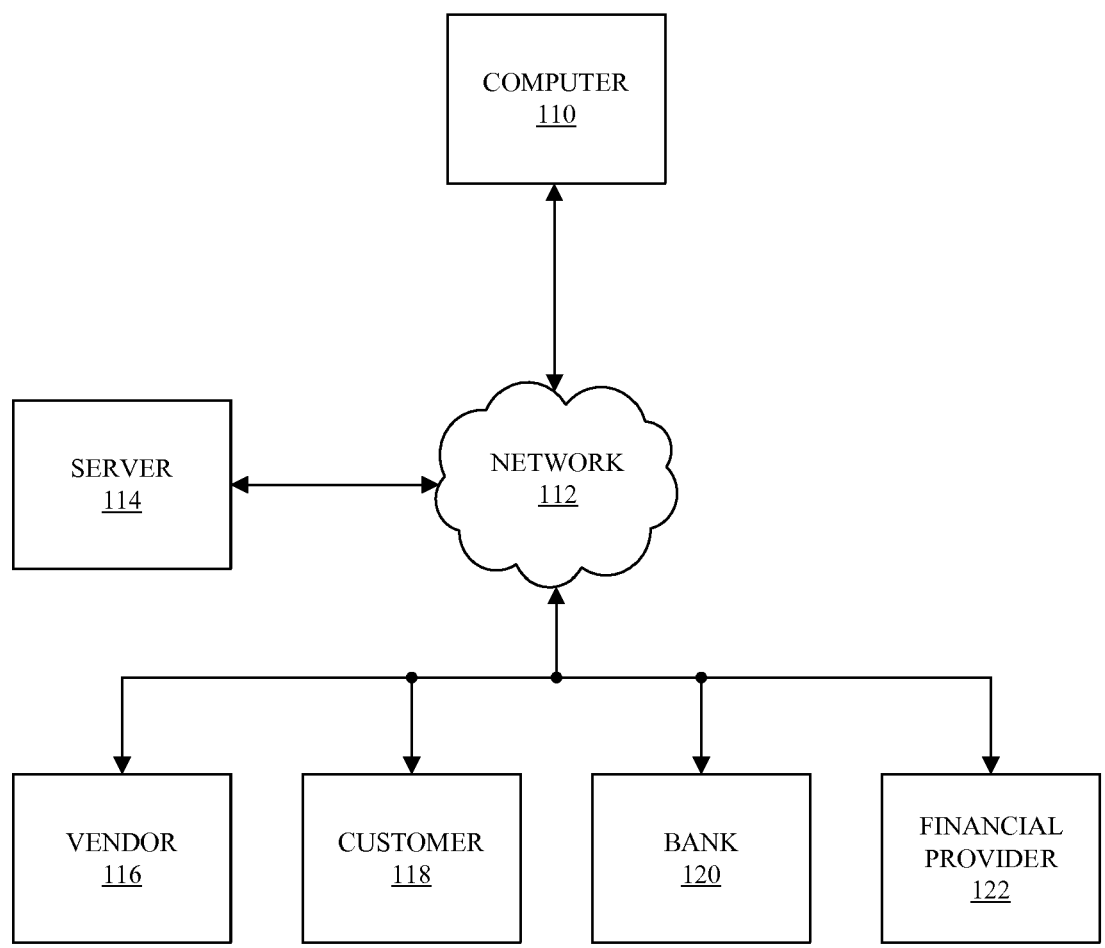
FIG. 1 is a block diagram illustrating a computer system that includes computers and servers that are networked together in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a user interface, a method, a computer system, and a computer program product (e.g., software) for use with the computer system are described. These devices and processes may be used to receive time entries in a timesheet of financial activities (and more generally, timed activities) in an intuitive manner. In particular, a given time entry, which is associated with a block of time, may be displayed as an adjustable region (such as an adjustable icon) in a calendar in a user interface or user-interface element presented by financial software. A user of this financial software may change one or more temporal parameters associated with the given time entry (such as a start time, a stop time, and/or a duration) by using a pointing device (such as a mouse) to select and modify one or more geometric properties of the adjustable region. For example, the user may click on an edge of the adjustable region, and may drag this edge to another location in the calendar, thereby changing a size of the adjustable region (and thus, the associated one or more temporal parameters). Alternatively (or additionally), the user may click on or proximate to the center of the adjustable region, and may drag the adjustable region to another location in the calendar, thereby changing a position of the adjustable region (and thus, the associated one or more temporal parameters).

Note that the given time entry may be associated with a financial activity, such as a service provided to a customer and/or time worked by an employee. Moreover, the adjustable region for the given time entry may display information associated with an estimated financial activity based on one or more previous financial activities. For example, the estimated financial activity may be based on a most recent financial activity of the user and/or a pattern of previous financial activities.

By facilitating intuitive input of one or more time entries in a timesheet, the user interface allows the user to provide this information accurately and efficiently. Therefore, the user interface offers an enhanced user experience when using the financial software, such as accounting software, payroll software and/or income-tax software.

Note that this user interface and the associated techniques may be implemented as a stand-alone software application, or as a program module or subroutine in another application, such as the financial software. Furthermore, the software may be configured to execute on a client computer, such as: a personal computer, a laptop computer, cell phone, PDA, or other device capable of manipulating computer-readable data, or between two or more computing systems over a network (such as the Internet, World Wide Web or WWW, Intranet, LAN, WAN, MAN, or combination of networks, or other technology enabling communication between computing systems). Therefore, information associated with the time entries may be stored locally (for example, on a local computer) and/or remotely (for example, on a computer or server that is accessed via a network).

We now describe embodiments of a computer system, a method, and software for receiving time entries in a timesheet. FIG. 1 presents a block diagram illustrating a computer system 100 that includes a number of computers and servers that are networked together. One or more users may provide one or more time entries in a timesheet (and, more generally, information associated with one or more financial activities) to a program, such as a financial program or financial software, that executes on computer 110. Using this financial software, an individual, an organization and/or a company (henceforth referred to as the entity) may conduct or perform one or more transactions via network 112. For example, the entity may conduct a financial transaction with: a vendor 116, a customer 118, a bank 120, and/or a financial provider 122. In some embodiments, the financial transaction may include billing the customer 118 for services rendered or paying the vendor 116 for services received. Alternatively, the entity may generate a payroll and may provide paychecks to one or more employees.

As noted above, this financial software may be a stand-alone application or may be embedded in another application. In one embodiment, the financial software includes software such as: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from Net-Suite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information. Additionally, in some embodiments the financial software includes software such as: Quicken™ (from Intuit, Inc., of Mountain View, Calif.), Microsoft Money™ (from Microsoft Corporation, of Redmond, Wash.), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other planning software capable of processing financial information.

In some embodiments, the financial software may be resident on the computer 110. However, other embodiments may utilize a financial tool that is embedded in a web page (once again, either as a stand-alone application or as a portion of another application). This web page may be provided by server 114 via network 112. In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript, ECMAScript instructions, VBScript instructions, or instructions in another programming language suitable for rendering by a browser or another client application on the computer 110.

As described further below with reference to FIG. 4, in embodiments where the financial tool is embedded in a web page or executes in an environment on computer 110, data associated with the one or more time entries may be temporarily stored on the computer 110. Subsequently, this data may be provided to the server 114 via the network 112. Moreover, the data stored on the server 114 may be periodically synchronized with the data stored on the computer 110.

Because the one or more time entries, as well as the information associated with the one or more financial activities, may be sensitive in nature, in some embodiments such information may be encrypted. Additionally, this information may be encrypted when it is communicated over the network 112.

Note that in some embodiments the computer system 100 includes fewer or additional components. Moreover, two or more components may be combined into a single component, and/or a position of one or more components may be changed.

Figure 2:
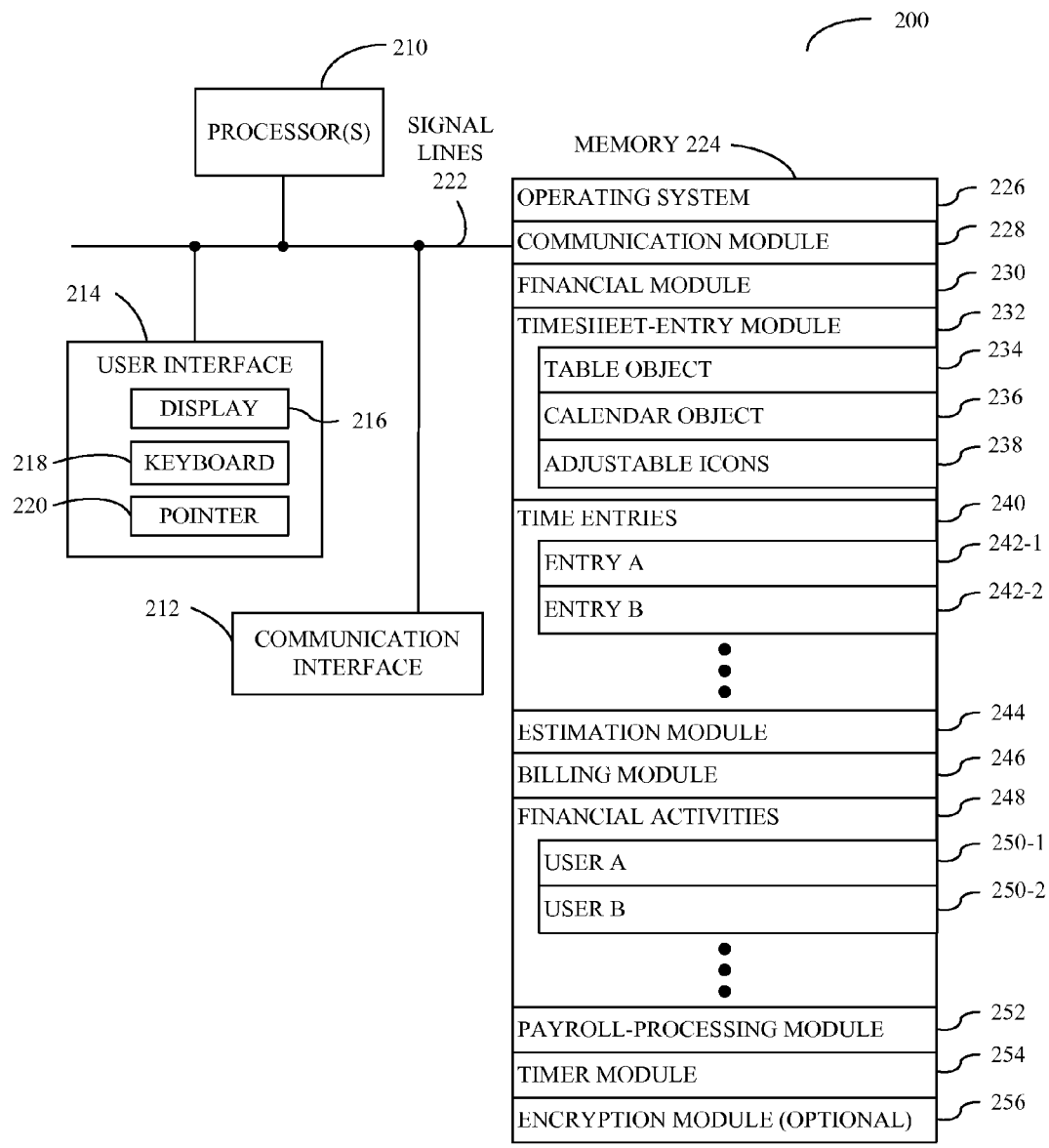
FIG. 2 is a block diagram illustrating a computer system in accordance with an embodiment of the present invention.

FIG. 2 presents a block diagram illustrating a computer system 200. The computer system 200 includes one or more processors 210, a communication interface 212, a user interface 214, and one or more signal lines 222 coupling these components together. Note that the one or more processing units 210: may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, Flash, one or more smart cards, one or more magnetic disc storage devices, and/or one or more optical storage devices. Memory 224 may store an operating system 226 that includes procedures (or a set of instructions) for handling various basic system services for performing hardware-dependent tasks. While not explicitly indicated in the computer system 200, in some embodiments the operating system 226 includes a web browser. Memory 224 may also store procedures (or a set of instructions) in a communication module 228. These communication procedures may be used for communicating with one or more computers and/or servers, including computers and/or servers that are remotely located with respect to the computer system 200.

Memory 224 may also include multiple program modules (or a set of instructions), including: financial module 230 (or a set of instructions), timesheet-entry module 232 (or a set of instructions), estimation module 244 (or a set of instructions), billing module 246 (or a set of instructions), payroll-processing module 252 (or a set of instructions), timer module 254 (or a set of instructions), and/or optional encryption module 256 (or a set of instructions).

While using the financial module 230, a user may provide time entries in a user interface associated with the timesheet-entry module 232. These time entries may be stored in time entries 240, such as entry A 242-1 and/or entry B 242-2. As noted previously, the time entries 240 may be associated with one or more financial activities 248, such as one or more financial activities of user A 250-1 and/or user B 250-2.

As described further below with reference to FIGS. 5A-5J, timesheet-entry module 232 may display a table object 234 (which may include a row-based table and/or pull-down menus) and/or a calendar object 236 in the user interface. In response to one or more time entries 240 provided by the user, for example, in the table object 234 and/or based on a user selection (such as clicking pointer 220 at a location in the calendar object 236), one or more adjustable icons 238 may be displayed at different locations or regions in the calendar object 236.

By modifying one or more geometric properties of a given adjustable icon (such as a size and/or a position), the user may modify one or more temporal parameters associated with the given adjustable icon. For example, the user may click and hold on a feature (such as an edge or the center of the given adjustable icon) using the pointer 220. Then, the user may drag this feature to a different position in the calendar object 236, thereby modifying the one or more temporal parameters. Alternatively (or additionally), the user may modify the one or more temporal parameters associated with the given adjustable icon by changing time entries in the table object 234. Note that changes in the table object 234 and/or the corresponding adjustable icon may be synchronized. Thus, when the one or more temporal parameters are modified by changing the one or more geometric properties of the given adjustable icon, the corresponding time entries in the table object 234 may be updated (and vice versa).

In some embodiments, initial values of the one or more temporal parameters are determined using timer module 254. These initial values may be displayed in the table object 234 and/or the calendar object 236. Moreover, the user may modify these initial values using either the table object 234 and/or the calendar object 236.

In some embodiments, the adjustable icons 238 are displayed in the calendar object 236 with information associated with an estimated financial activity based on the estimation module 244. For example, the estimation module 244 may use a most-recent financial activity of the user and/or the entity in financial activities 248. Alternatively (or additionally), the estimation module 244 may determine the estimated financial activity based on a pattern of financial activities of the user and/or the entity in the financial activities 248. In some embodiments, the estimation module 244 uses a supervised-learning technique, such as classification and regression tree (CART) and/or support vector machines (SVM).

Note that based on one or more of the time entries 240, as well as associated information in financial activities 248, billing module 246 may generate a bill for a customer and/or payroll-processing module 252 may generate paychecks or income-tax statements for one or more employees.

In some embodiments, optional encryption module 256 encrypts information stored in memory 224 and/or information communicated using communication interface 212.

Instructions in the various modules in the memory 224 may be implemented in: a high-level procedural language, an object-oriented programming language, and/or in an assembly or machine language. Note that the programming language may be compiled or interpreted, e.g., configurable or configured to be executed by the one or more processing units 210.

Although the computer system 200 is illustrated as having a number of discrete items, FIG. 2 is intended to be a functional description of the various features that may be present in the computer system 200 rather than a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

Computer system 200 may include fewer components or additional components. Moreover, two or more components may be combined into a single component, and/or a position of one or more components may be changed. In some embodiments, the functionality of the computer system 200 may be implemented more in hardware and less in software, or less in hardware and more in software, as is known in the art.

We now discuss methods for receiving one or more time entries in a timesheet. FIG. 3 presents a flow chart illustrating a process 300 for receiving one or more time entries in a timesheet, which may be performed by a computer system. During operation, the computer system displays a calendar that contains one or more time entries associated with at least a financial activity (310), where a given time entry is graphically represented as an adjustable region in the calendar associated with a corresponding block of time. Then, the computer system receives user instructions to change a given time entry (312), where the user instructions involve the user selecting and modifying one or more geometric properties of the corresponding adjustable region for the time entry. Next, the computer system modifies the displayed adjustable region based on the received user instructions (314).

Figure 4:
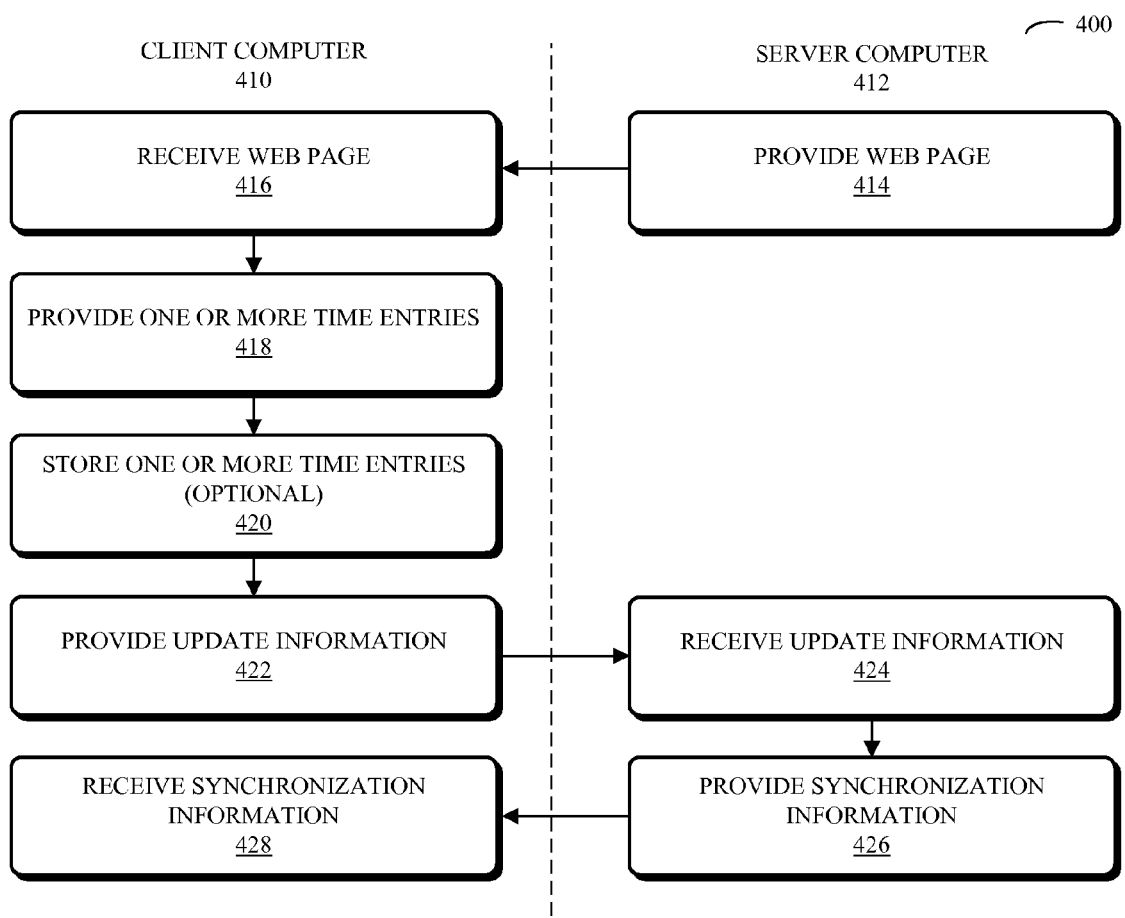
FIG. 4 is a flow chart illustrating a process for receiving one or more time entries in a timesheet in accordance with an embodiment of the present invention.

FIG. 4 presents a flow chart illustrating a process 400, such as that utilized in an on-line environment, for receiving one or more time entries in a timesheet. During process 400, an application executing, at least in part, on a server computer 412, provides a web page (414) that includes an embedded financial tool. Then, the user receives the web page (416).

Next, the user provides one or more time entries (418), which may be optionally stored (420) on client computer 410. For example, the user may modify one or more geometric properties of a given adjustable icon in a calendar that is displayed in a user interface. Note that information associated with the one or more time entries may be in a format that is appropriate for the financial software that executes on the server computer 412.

Moreover, update information (which includes the one or more time entries) is provided (422) by the client computer 410, and then received (424) at the server computer 412. Subsequently, such as after a time interval or periodically, the server computer 412 provides synchronization information (426) that is received (428) by the client computer 410. Note that this synchronization information may copy a current data structure associated with the financial software (and which includes information associated with one or more users over time) to the client computer 410.

In some embodiments of processes 300 (FIG. 3) and 400 there may be additional or fewer operations. Moreover, the order of the operations may be changed, and two or more operations may be combined into a single operation.

We now describe embodiments of the user interface. FIG. 5A presents a screenshot illustrating a user interface 500 for receiving time entries in a timesheet. This user interface includes a user-interface element in the form of a calendar (henceforth referred to as a calendar view). In the calendar view, time entries associated with financial activities and corresponding blocks of time are shown as adjustable regions 508. A user of the financial software may add or remove a region by selecting an add icon 502 or a delete icon 504, respectively.

In particular, when the user selects the add icon 502, another region may be added to the calendar view at a position corresponding to the current date and time. Alternatively (or additionally), the user may click and holding down a mouse button in the calendar view. When the user releases the mouse button, the other region may be added to the calendar view at the current position. In this way, the user may have added the other region using a single, continuous action. However, in some embodiments the user adds the other region by selecting a desired location in the calendar view (for example, by clicking on it using a mouse). Note that, to remove a given region, the user may select the given region (for example, by clicking on it using a mouse, thereby making it the current or active region) and then may activate the delete icon 504 (for example, by clicking on it using a mouse).

Figure 5B:
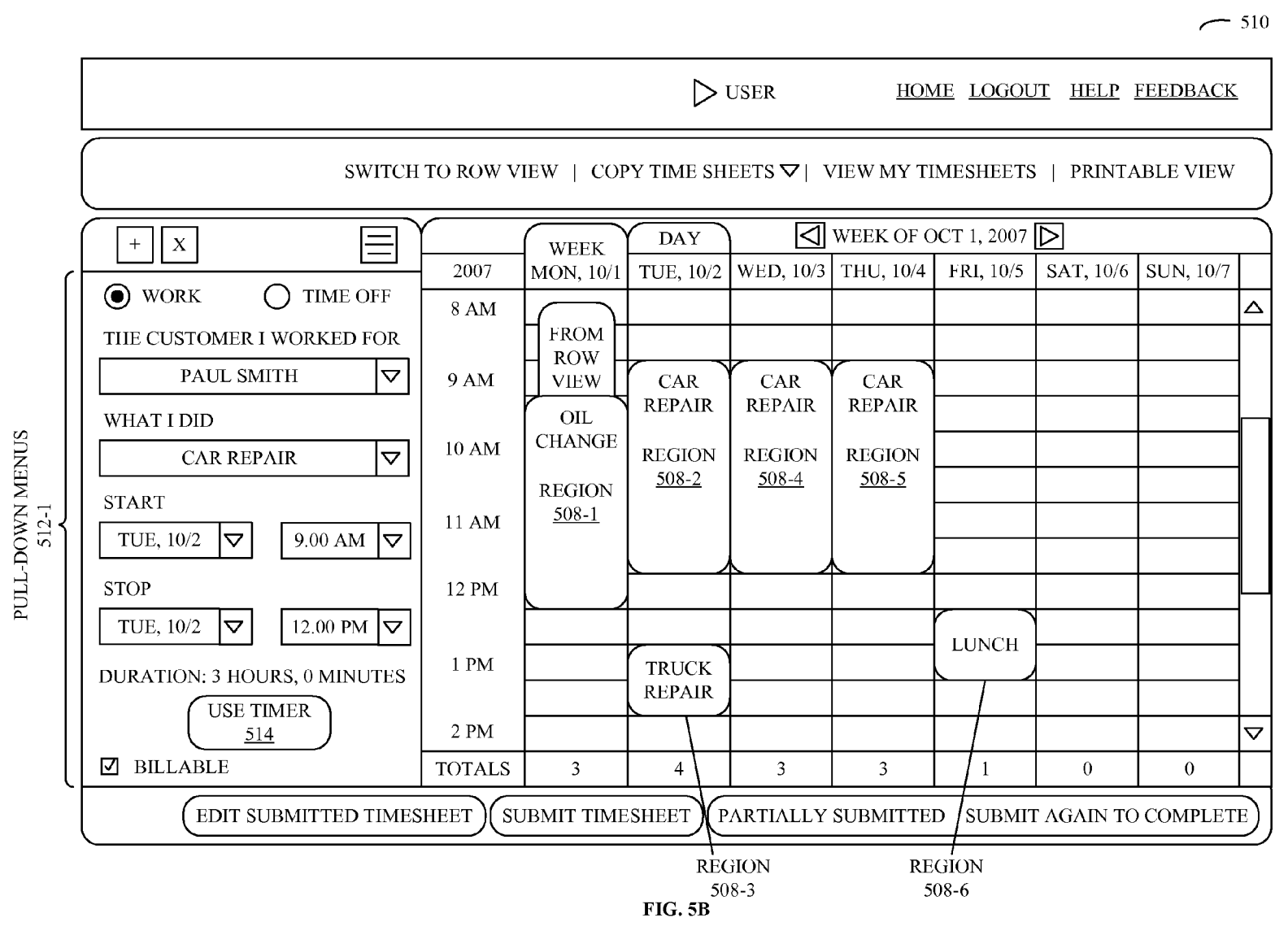

By selecting a summary icon 506, the user may switch from a user interface that presents a summary of the timesheet information on the left-hand side to another embodiment that includes one or more pull-down menus. This is shown in FIG. 5B, which presents a screenshot illustrating a user interface 510 for receiving time entries in a timesheet. This embodiment includes pull-down menus 512-1. Using one or more of the pull-down menus 512-1, the user may enter or modify one or more temporal parameters (such as a start time, an end time, and/or a duration) of a given time entry, as well as associated financial information (such as a customer name and/or a service provided).

Alternatively (or additionally), the user can change one or more temporal parameters associated with the given time entry by using a pointing device (such as a mouse) to select and modify one or more geometric properties of the given region (such as region 508-1). In particular, the user may select and modify the given region by selecting a feature of the given region (for example, by clicking on the feature using a mouse) and then dragging the feature from a first position in the calendar view to a second position in the calendar view (such as within a day and/or across multiple days). For example, the feature may include an edge of the given region and/or a position of the given region. Moreover, the one or more geometric properties may include a size of the given region and/or a position of the given region.

Note that changes entered using one or more of the pull-down menus 512-1 may be reflected in the corresponding region, and modifications to the one or more geometric properties of the given region may be reflected in one or more of the pull-down menus 512-1.

In some embodiments, the given region for the given time entry displays information associated with an estimated financial activity (such as 'oil change' for region 508-1) based on one or more previous financial activities of a user and/or an entity. For example, the one or more previous financial activities may include a most recent financial activity and/or a pattern of previous financial activities (such as user history). Note that the financial activity may be associated with: a customer, a project, a vendor, and/or a service item.

Moreover, in some embodiments initial values of the one or more temporal parameters for one or more of the time entries are determined by a timer application that was previously activated by the user. For example, the user may select the use timer icon 514. Alternatively (or additionally), the given time entry may be initialized using an estimated time entry with estimated temporal parameters, for example, based on the most recent financial activity and/or the pattern of previous financial activities (such as the user history). In this way, recurring time entries in a timesheet, which have the same or similar temporal parameters, may be replicated, thus reducing user effort in providing this information.

In some embodiments, the user interface includes a billing mechanism which uses the one or more time entries to generate a bill for a customer (such as when the one or more time entries specify time spent providing a service to the customer). Moreover, the one or more time entries may be specified as billable or non-billable time, for example, by selecting or checking the 'billable' box in the pull-down menus 512-1.

Note that the contents of one or more pull-down menus may be determined based on a user-selected context. For example, the user may select 'time off' instead of 'work' in the pull-down menus 512-1. This is shown in FIG. 5C, which presents a screenshot illustrating a user interface 520 for receiving time entries in a timesheet. In this embodiment, an employee uses pull-down menus 512-2 and/or modifies region 522 to specify temporal parameters associated with vacation time (or, alternatively, sick time, or other time off, which may be paid or unpaid). For this context, in some embodiments the default financial activity associated with the given time entry may be 'vacation.'

In other embodiments, the context includes an administrator view (as opposed to the employee view illustrated in the preceding embodiments), which may display different and/or additional information. Moreover, the time entries provided in the 'work' and/or the 'time off' contexts may be used by a payroll-processing mechanism to generate one or more paychecks and income-tax statements for one or more employees.

Figure 5D:
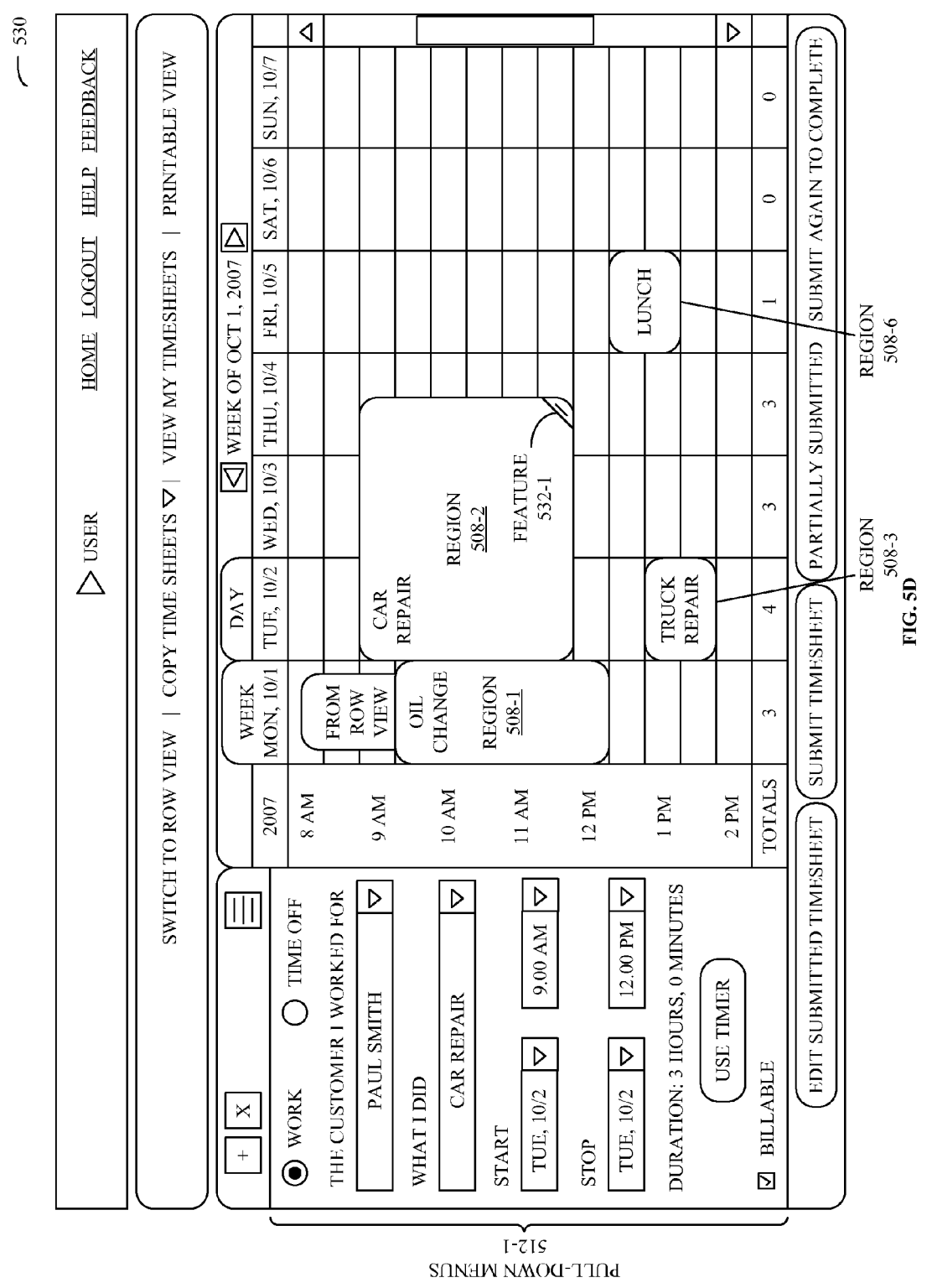

As noted previously, regions 508 may be adjustable. This may allow the user to modify one or more temporal parameters associated with the given region. For example, as shown in FIG. 5D, which presents a screenshot illustrating a user interface 530 for receiving time entries in a timesheet, the user may select feature 532-1 at a lower right-hand corner of region 508-2. Then, the user may drag feature 532-1 from a first position in the calendar view to a second position in the calendar view, thereby replicating the time entry across multiple days in the calendar view.

Figure 5E:
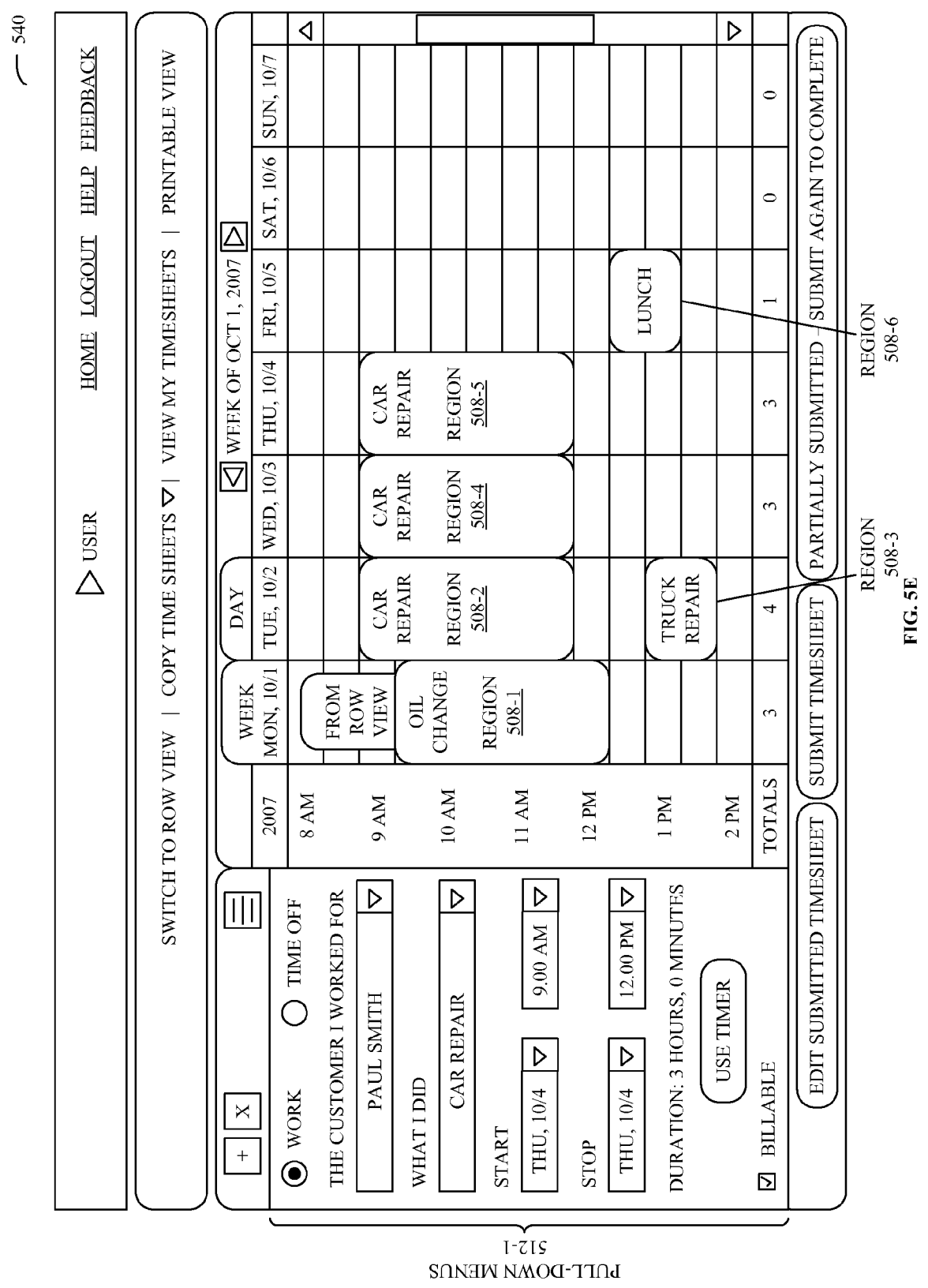

As shown in FIG. 5E, which presents a screenshot illustrating a user interface 540 for receiving time entries in a timesheet, after releasing the feature 532-1 (for example, by releasing the mouse button), region 508-2 may be segmented or divided into regions 508-2, 508-4 and 508-5, each of which is associated with a given day in the calendar view. Note that pull-down menu 512-1 may be appropriately updated when the user completes this modification.

In some embodiments, the user may also divide the given region into a first region and a second region by superimposing a third region over the given region. Note the third region may be associated with a different financial activity than that of the first region or the second region.

Figure 5F:
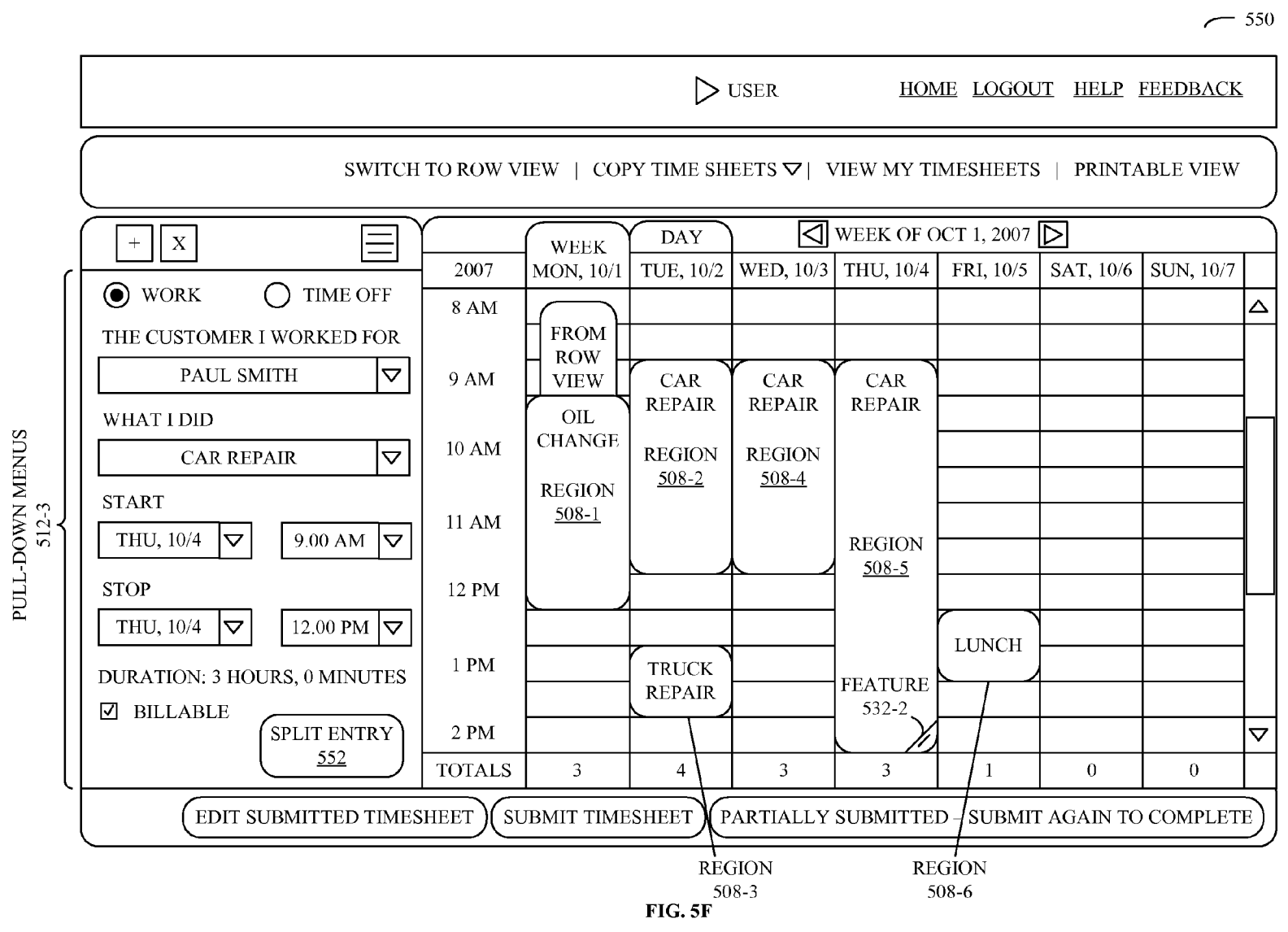

Alternatively (or additionally), the user can separate a duration of the given region into two time intervals (such as a regular-work time interval and an overtime time interval) by selecting or placing a splitter (which is also referred to as a split line) over the given region. In particular, the user can initiate this operation by selecting split-entry icon 552 as shown in FIG. 5F, which presents a screenshot illustrating a user interface 550 for receiving time entries in a timesheet.

Figure 5G:
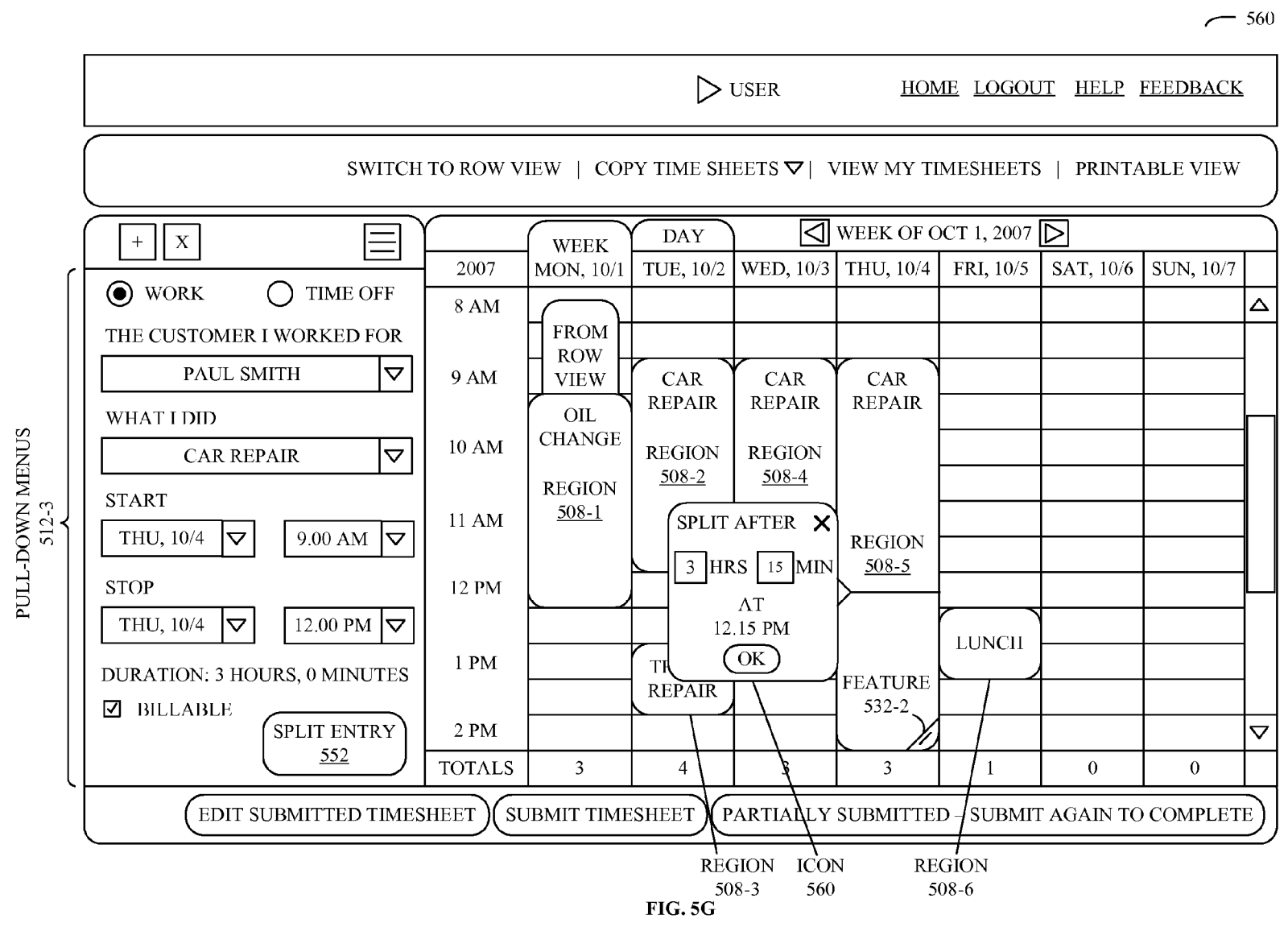

As shown in FIG. 5G, which presents a screenshot illustrating a user interface 560 for receiving time entries in a timesheet, after selecting the split-entry icon 552, icon 560 is displayed in the calendar. Using this icon, the user can adjust the split-entry time. Alternatively (or additionally), the user can change the position of the splitter by selecting and then dragging the splitter from a first position in region 508-5 to a second position in the region 508-5.

Figure 5H:
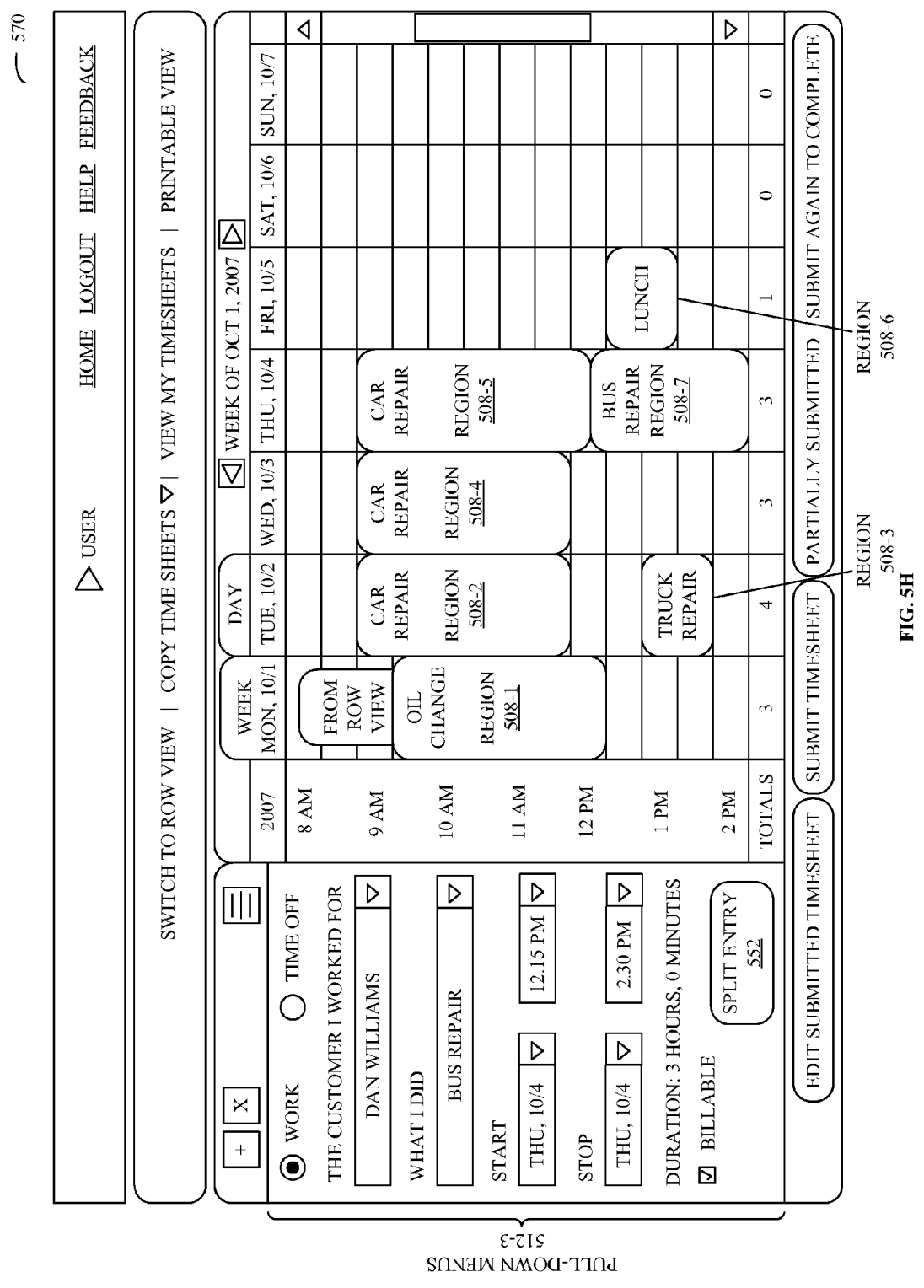

Once the splitter has been appropriately position, the user may select the 'OK' button in icon 560, thereby inserting the splitter. This is shown in FIG. 5H, presents a screenshot illustrating a user interface 570 for receiving time entries in a timesheet. Note that region 508-5 has been split into regions 508-5 and 508-7, each of which may be associated with a separate financial activity.

In some embodiments, a table or tabular structure in the user interface (henceforth referred to as a row view) is used to provide at least some information associated with one or more time entries. This is shown in FIG. 5I, which presents a screenshot illustrating a user interface 580 for receiving time entries in a timesheet. Using the row view, the user the user may define parameters for multiple time entries. For example, the user may provide one or more financial activities (such as vacation) and associated duration(s).

Figure 5J:
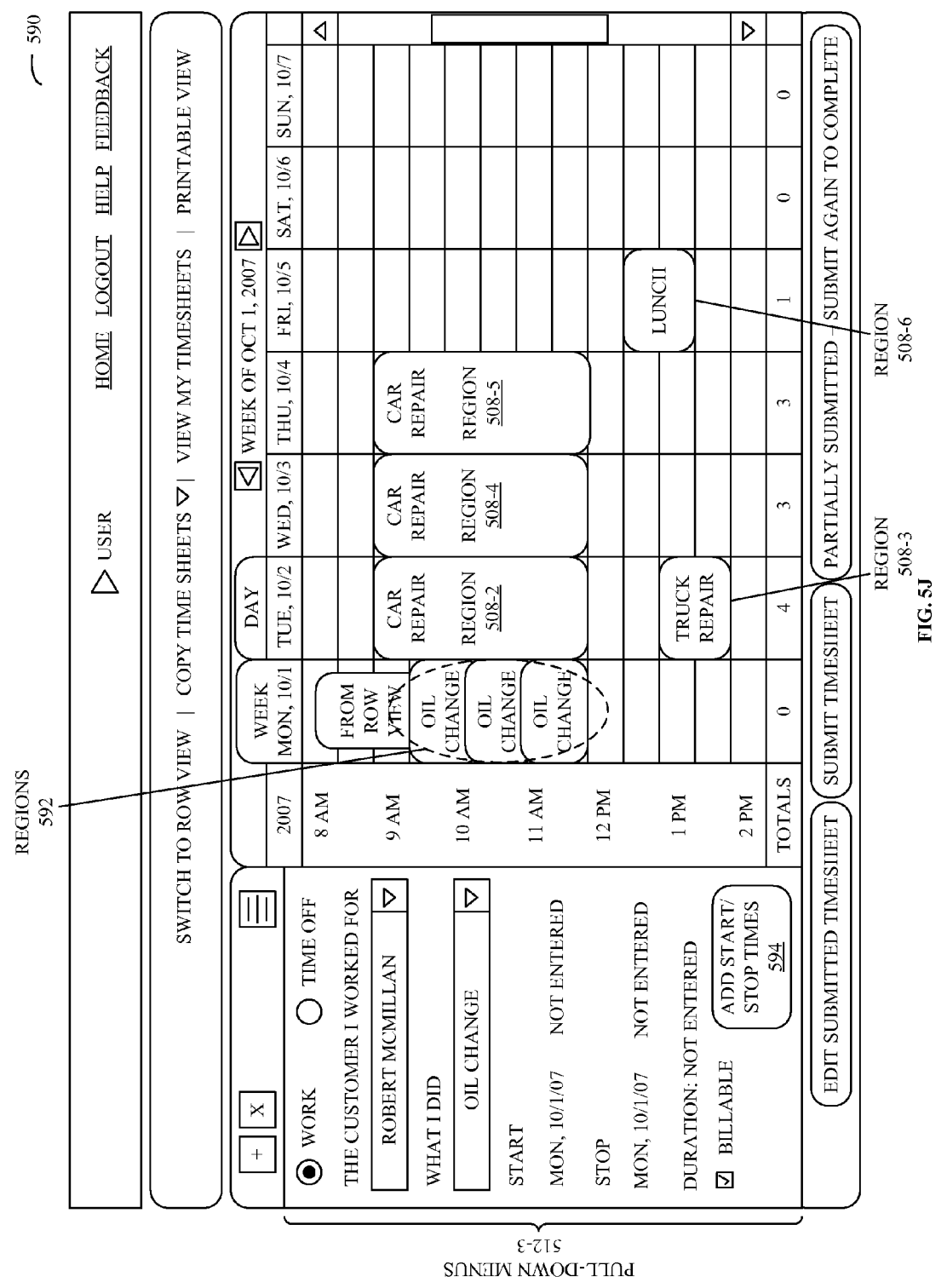

Then, the user may switch to calendar view in order to define one or more temporal parameters associated with the multiple time entries (such as start times and/or stop times). This is shown in FIG. 5J, which presents a screenshot illustrating a user interface 590 for receiving time entries in a timesheet. Note that regions 592, which were partially defined in the row view in user interface 580 (FIG. 5), are initially placed in close proximity and/or on top of each other. Using the calendar view, the user may define start times and stop times for regions 592. For example, by selecting add start/stop-times icon 594, the user may modify one or more of pull-down menus 512-3. Alternatively (or additionally), the user may reposition and/or modify the geometric properties of regions 592 in the calendar view to define these temporal parameters.

User interfaces 500 (FIG. 5A), 510 (FIG. 5B), 520 (FIG. 5C), 530 (FIG. 5D), 540 (FIG. 5E), 550 (FIG. 5F), 560 (FIG. 5G), 570 (FIG. 5H), 580 (FIG. 5I), and 590 may include fewer components or additional components. For example, the calendar view may days, weeks, months, and/or years. Additionally, one or more of these user interfaces may include a notes field, which the user can use to specify annotation information associated with one or more financial activities.

Moreover, two or more components may be combined into a single component, and/or a position of one or more components may be changed. Note that in some embodiments these user interfaces are included in a shared calendaring application that is used by multiple users.

Figure 6:
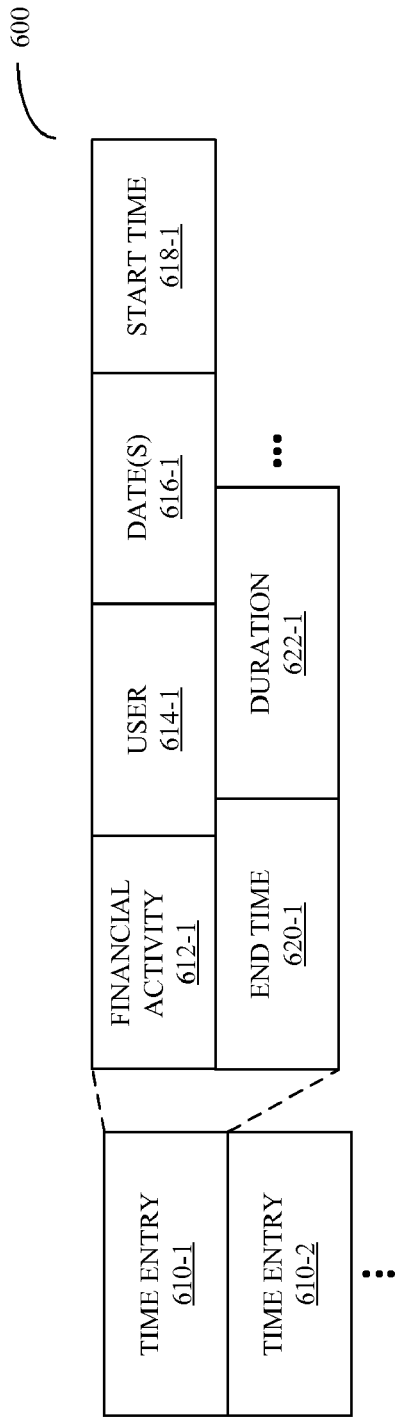
FIG. 6 is a block diagram illustrating a data structure in accordance with an embodiment of the present invention.

We now discuss data structures that may be used in the computer system 100 (FIG. 1) and/or 200 (FIG. 2). FIG. 6 presents a block diagram illustrating a data structure 600. This data structure may include time entries 610 for one or more users of the financial software. For example, time entry 610-1 for a user may include: financial activity 612-1 (such as a customer job, a service item, a vendor name, or payroll information), user 614-1, date(s) 616-1, start time 618-1, end time, 620-1, and/or duration 622-1.

Figure 7:
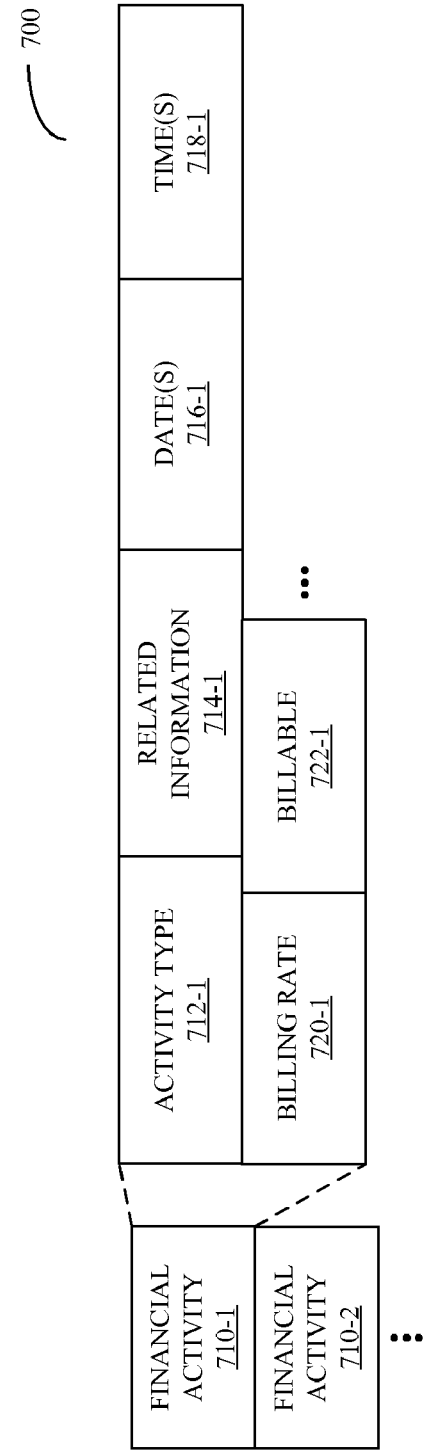
FIG. 7 is a block diagram illustrating a data structure in accordance with an embodiment of the present invention.

FIG. 7 presents a block diagram illustrating a data structure 700. This data structure may include financial activities 710 for one or more users of the financial software. For example, financial activity 710-1 may include: activity type 712-1 (such as payroll or invoice), related information 714-1 (such as a description of the work performed), dates 716-1, times 718-1, billing rate 720-1, and/or whether or not financial activity is billable 722-1.

Note that that in some embodiments of the data structures 600 (FIG. 6) and/or 700 there may be fewer or additional components. Moreover, two or more components may be combined into a single component, and/or a position of one or more components may be changed.

While the preceding embodiments have used time entries associated with financial activities as an illustrative example, in other embodiments the user interface and the associated techniques may be used to facilitate intuitive entry of time entries associated with a variety of activities, including activities other than financial activities (such as activities in a calendar or a scheduling application).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for entering a time entry in a timesheet with a calendar view, wherein the computer includes a processor, the method comprising:

providing, by the computer, a row view and a calendar view of a timesheet, wherein the row view displays a date and a duration associated with a time entry in a table, and wherein the calendar view displays the time entry as an adjustable region whose geometric properties indicate the date and the duration that correspond to the time entry;

receiving from a user the time entry, which includes time-related information that is limited to the date and the duration, in the row view of the timesheet;

switching from the row view to the calendar view;

displaying, by a display coupled to the computer, the time entry received from the user as an adjustable region at a default location in the calendar view of the timesheet;

providing a control to the user for specifying the start time or the end time associated with the time entry in the calendar view;

adjusting the geometric properties of the adjustable region in response to the user specifying the start time or the end time;

receiving from the user a request to superimpose a third adjustable region over the adjustable region between a first adjustable sub-region and a second adjustable sub-region;

allowing the user to superimpose the third adjustable region over the adjustable region, wherein the third adjustable region is associated with a different financial activity than that of the adjustable region;

creating a second time entry corresponding to the second adjustable sub-region; and creating a third time entry corresponding to the third adjustable region.

2. The method of claim 1, wherein the adjustable region for the time entry displays information associated with an estimated financial activity based on one or more previous financial activities.

3. The method of claim 2, wherein the one or more previous financial activities include a most recent financial activity.

4. The method of claim 2, wherein the one or more previous financial activities include a pattern of previous financial activities.

5. The method of claim 4, wherein the estimated financial activity is determined using a supervised-learning technique.

6. The method of claim 1, further comprising a billing mechanism which uses one or more time entries in the calendar to generate a bill for a customer based on the one or more time entries.

7. The method of claim 6, wherein the one or more time entries are used to specify time spent providing a service to the customer.

8. The method of claim 7, wherein the one or more time entries specify billable or non-billable time.

9. The method of claim 1, further comprising a payroll-processing mechanism which uses one or more time entries in the calendar to generate one or more paychecks.

10. The method of claim 9, wherein the one or more time entries specify time worked, paid time off, or unpaid time off 11. The method of claim 1, wherein initial values of the start time and the end time associated with the time entry are determined by a timer application that was previously activated by the user.

12. The method of claim 1, wherein adjusting the one or more geometric properties of the adjustable region comprises selecting a feature of the adjustable region and dragging the feature from a first position to a second position in the calendar view of the timesheet.

13. The method of claim 12, wherein the feature includes an edge of the adjustable region or a position inside the adjustable region.

14. The method of claim 1, wherein the one or more geometric properties include a size of the adjustable region or a position of the adjustable region.

15. The method of claim 1, wherein the time entry is in a form which is suitable for use by financial software.

16. The method of claim 15, wherein the financial software includes accounting software, payroll software or income-tax software.

17. The method of claim 1, wherein the time entry is initialized using an estimated time entry with an estimated start time and an estimated end time.

18. The method of claim 1, wherein the row view further comprises a table including one or more pull-down menus, which facilitates the user to modify parameters for the time entry using the one or more pull-down menus.

19. The method of claim 18, wherein contents of the one or more pull-down menus are determined based on a user-selected context.

20. The method of claim 18, wherein modifications to the time entry are reflected in the one or more pull-down menus.

21. The method of claim 1, further comprising:
receiving from the user a request to replicate the time entry across multiple days in the calendar view;
allowing the user to select a feature of the adjustable region, and drag the feature from a first position to a second position in the calendar view, wherein the first position is associated with the date and the second position is associated with another date; and
creating a new time entry comprising the another date and the duration.

22. The method of claim 1, further comprising:
receiving from the user a request to separate the adjustable region into a first adjustable sub-region and a second adjustable sub-region;
allowing the user to place a splitter over the adjustable region;
creating a first time entry corresponding to the first adjustable sub-region;
and creating a second time entry corresponding to the second adjustable sub-region.

23. The method of claim 22, further comprising:
receiving from the user a request to change a position of the splitter;
allowing the user to drag the splitter from a first position in the adjustable region to a second position in the adjustable region; and
changing the first or second time entries corresponding to the first and second adjustable sub-regions based on a change in position of the splitter.

24. The method of claim 1, further comprising:
defining a parameter for multiple time entries in the timesheet;
allowing the user to adjust, for a given time entry of the multiple time entries, a geometric property of a corresponding adjustable region in the calendar view; and
adjusting the parameter for the multiple time entries based on the adjusted geometric property.

25. The method of claim 24, wherein adjustable regions corresponding to the multiple time entries are initially stacked on top of each other in the calendar until an adjustment to a geometric property of the multiple time entries is received from the user.

26. The method of claim 2, wherein the financial activity is associated with a customer, a project, a vendor, a service item, or an employee. sub-region and a second adjustable sub-region;
allowing the user to superimpose the third adjustable region over the adjustable region, wherein the third adjustable region is associated with a different financial activity than that of the adjustable region;
creating a second time entry corresponding to the second adjustable sub-region; and
creating a third time entry corresponding to the third adjustable region.

27. A computer program product for use in conjunction with a computer system, the computer program product comprising a non-transitory computer-readable storage medium and a computer-program mechanism embedded therein for configuring the computer system configured to enter a time entry in a timesheet with a calendar view, the computer-program mechanism including:
instructions for providing a row view and a calendar view of a timesheet, wherein the row view displays a date and a duration associated with a time entry in a table, and wherein the calendar view displays the time entry as an adjustable region whose geometric properties indicate the date and the duration that correspond to the time entry;
instructions for receiving from a user the time entry, which includes time-related information that is limited to the date and the duration, in the row view of the timesheet;
instructions for switching from the row view to the calendar view;
instructions for displaying the time entry received from the user as an adjustable region at a default location in the calendar view of the timesheet;
instructions for providing a control to the user for specifying the start time or the end time associated with the time entry in the calendar view;
instructions for adjusting the geometric properties of the adjustable region in response to the user specifying the start time or the end time;
instructions for receiving from the user a request to superimpose a third adjustable region over the adjustable region between a first adjustable sub-region and a second adjustable sub-region;
instructions for allowing the user to superimpose the third adjustable region over the adjustable region, wherein the third adjustable region is associated with a different financial activity than that of the adjustable region;
instructions for creating a second time entry corresponding to the second adjustable sub-region; and
instructions for creating a third time entry corresponding to the third adjustable region.

28. An apparatus for entering a time entry in a timesheet with a calendar view comprising:
a processor;
a memory;
a viewing mechanism configured to provide a row view and a calendar view of a timesheet, wherein the row view displays a date and a duration associated with a time entry in a table, and wherein the calendar view displays the time entry as an adjustable region whose geometric properties indicate the date and the duration that correspond to the time entry;
a receiving mechanism configured to receive from a user the time entry, which includes time-related information that is limited to the date and the duration, in the row view of the timesheet;
a switching mechanism configured to switch from the row view to the calendar view;

a displaying mechanism configured to display the time entry received from the user as an adjustable region at a default location in the calendar view of the timesheet;

a controlling mechanism configured to provide a control to the user for specifying the start or the end time associated with the time entry in the calendar view;

an adjusting mechanism configured to adjust the geometric properties of the adjustable response to the user specifying the start time or the end time;

the receiving mechanism further configured to receive from the user a request to superimpose a third adjustable region over the adjustable region between a first adjustable sub-region and a second adjustable sub-region;

an allowing mechanism configured to allow the user to superimpose the third adjustable region over the adjustable region, wherein the third adjustable region is associated with a different financial activity than that of the adjustable region;

a creating mechanism configured to create a second time entry corresponding to the second adjustable sub-region; and the creating mechanism further configured to create a third time entry corresponding to the third adjustable region.

29. A computer-implemented method for entering a time entry in a timesheet with a calendar view, wherein the computer includes a processor, the method comprising:

providing, by the computer, a row view and a calendar view of a timesheet, wherein the row view displays a date and a duration associated with a time entry in a table, and wherein the calendar view displays the time entry as an adjustable region whose geometric properties indicate the date and the duration that correspond to the time entry;

receiving from a user the time entry, which includes time-related information that is limited to the date and the duration, in the row view of the timesheet;

switching from the row view to the calendar view;

displaying, by a display coupled to the computer, the time entry received from the user as an adjustable region at a default location in the calendar view of the timesheet;

providing a control to the user for specifying the start time or the end time associated with the time entry in the calendar view;

adjusting the geometric properties of the adjustable region in response to the user specifying the start time or the end time;

receiving from the user a request to separate the adjustable region into a first adjustable sub-region and a second adjustable sub-region;

allowing the user to place a splitter over the adjustable region;

creating a first time entry corresponding to the first adjustable sub-region; and creating a second time entry corresponding to the second adjustable sub-region.

30. A computer program product for use in conjunction with a computer system, the computer program product comprising a non-transitory computer-readable storage medium and a computer-program mechanism embedded therein for configuring the computer system configured to enter a time entry in a timesheet with a calendar view, the computer-program mechanism including:

instructions for providing a row view and a calendar view of a timesheet, wherein the row view displays a date and a duration associated with a time entry in a table, and wherein the calendar view displays the time entry as an adjustable region whose geometric properties indicate the date and the duration that correspond to the time entry;

instructions for receiving from a user the time entry, which includes time-related information that is limited to the date and the duration, in the row view of the timesheet;

instructions for switching from the row view to the calendar view;

instructions for displaying the time entry received from the user as an adjustable region at a default location in the calendar view of the timesheet;

instructions for providing a control to the user for specifying the start time or the end time associated with the time entry in the calendar view;

instructions for adjusting the geometric properties of the adjustable region in response to the user specifying the start time or the end time;

instructions for receiving from the user a request to separate the adjustable region into a first adjustable sub-region and a second adjustable sub-region;

instructions for allowing the user to place a splitter over the adjustable region;

instructions for creating a first time entry corresponding to the first adjustable sub-region; and instructions for creating a second time entry corresponding to the second adjustable sub-region.

31. An apparatus for entering a time entry in a timesheet with a calendar view comprising:

a processor;

a memory;

a viewing mechanism configured to provide a row view and a calendar view of a timesheet, wherein the row view displays a date and a duration associated with a time entry in a table, and wherein the calendar view displays the time entry as an adjustable region whose geometric properties indicate the date and the duration that correspond to the time entry;

a receiving mechanism configured to receive from a user the time entry, which includes time-related information that is limited to the date and the duration, in the row view of the timesheet;

a switching mechanism configured to switch from the row view to the calendar view;

a displaying mechanism configured to display the time entry received from the user as an adjustable region at a default location in the calendar view of the timesheet;

a controlling mechanism configured to provide a control to the user for specifying the start or the end time associated with the time entry in the calendar view;

an adjusting mechanism configured to adjust the geometric properties of the adjustable response to the user specifying the start time or the end time;

the receiving mechanism further configured to receive from the user a request to separate the adjustable region into a first adjustable sub-region and a second adjustable sub-region;

an allowing mechanism configured to allow the user to place a splitter over the adjustable region;

a creating mechanism configured to create a first time entry corresponding to the first adjustable sub-region; and the creating mechanism further configured to create a second time entry corresponding to the second adjustable sub-region.

* * * * *